Sept. 8, 1942.   F. G. BRADDON   2,295,198
UNIVERSAL OSCILLATION DAMPER FOR SENSITIVE INSTRUMENTS
Filed Dec. 2, 1939
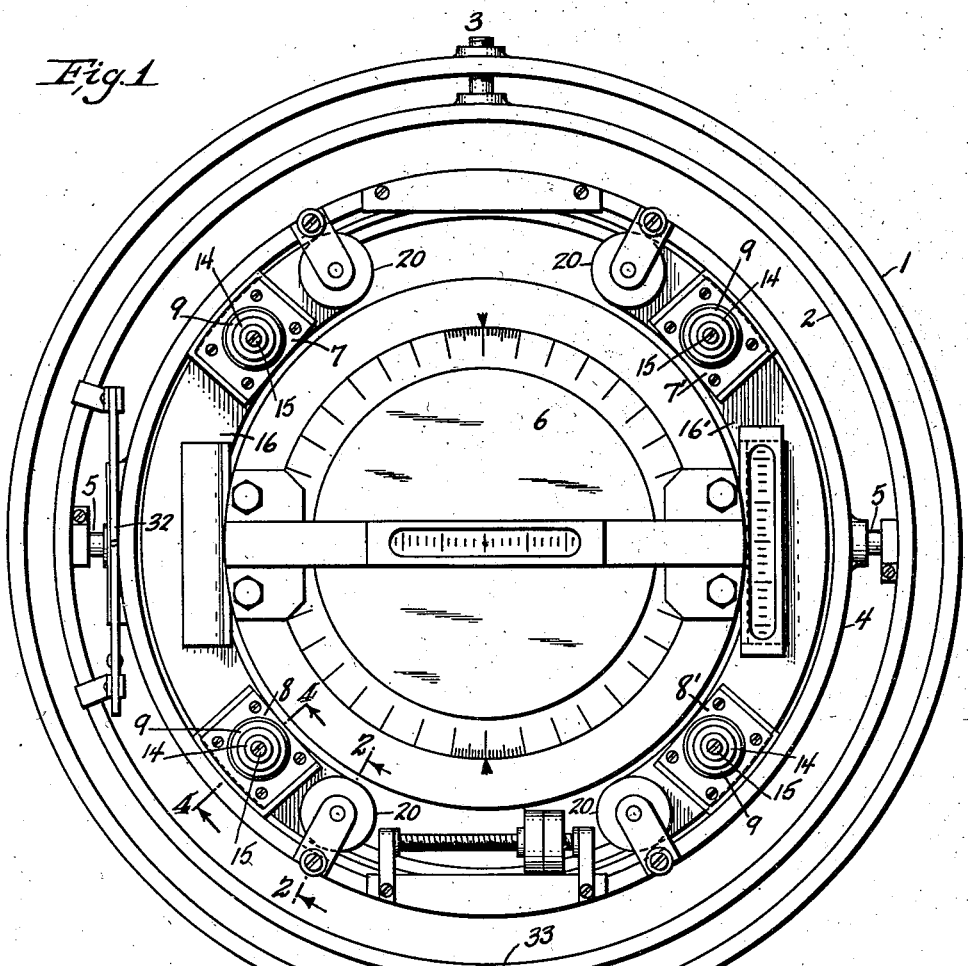
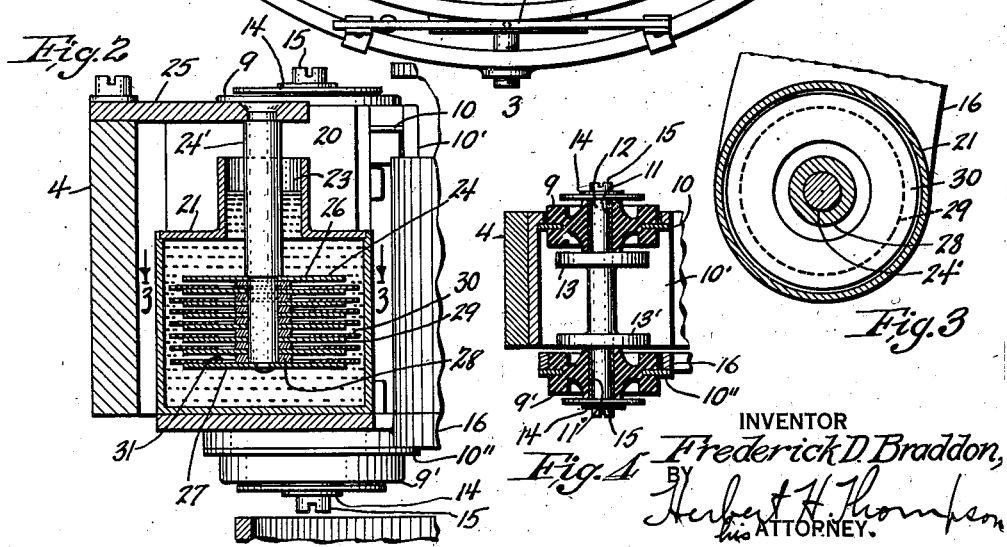
INVENTOR
Frederick D. Braddon,
BY Herbert H. Thompson
his ATTORNEY.

Patented Sept. 8, 1942

2,295,198

UNITED STATES PATENT OFFICE 2,295,198

UNIVERSAL OSCILLATION DAMPER FOR SENSITIVE INSTRUMENTS

Frederick D. Braddon, Babylon, N. Y., assignor to Sperry Gyroscope Company, Inc., Brooklyn, N. Y., a corporation of New York Application December 2, 1939, Serial No. 307,214

4 Claims. (Cl. 248—358)

This invention relates to resilient supports for sensitive instruments, and more especially, to means for damping the oscillations of the sensitive instrument in the resilient support in all planes. More particularly, this invention constitutes an improvement in the vibration damping means disclosed as one part of the resilient mounting for gyro compasses disclosed in my prior Patent 2,213,832, for Anti-vibration mount for direction indicating instruments, dated September 3, 1940.

As disclosed in my aforesaid patent, I place a universal rubber shock mounting inside of a universally pivoted ring from which the gyroscope proper is suspended and which effectively absorbs vibrations in all planes. It is also necessary, however, to damp out oscillations of the compass and its gimbal, both translatory and rotational and for this purpose I place between the compass and said inner ring one or more especially designed universal dampers, which act both as vibration energy absorbers and to throw the oscillations of the compass and its support out of phase with the causitive ship's vibrations and also out of phase with the oscillations of the inner ring and its supported parts.

Referring to the drawing:

Fig. 1 is a plan view of the gyroscopic compass showing my improved mounting thereof.

Fig. 2 is a vertical section on line 2—2 of Fig. 1 on a larger scale, showing the construction of my improved damper.

Fig. 3 is a horizontal section on line 3—3 of Fig. 2.

Fig. 4 is a detail sectional view of one of the resilient supports mounted adjacent the damper, taken on line 4—4 of Fig. 1.

In Fig. 1 of the drawing, the outer support or binnacle of the compass is shown at 1 in which is pivotally mounted the gimbal ring 2 on axis 3—3. An inner or second ring in turn is mounted within ring 2 on transverse axis 5—5, the inner ring thereby constituting a universally gimballed support. The compass proper 6 is mounted within the inner ring 4 by means of universal resilient shock absorbing devices 7, 7' and 8, 8'. Each shock absorber comprises a rubber disc-like member 9 which is supported around its periphery by means of a metal plate 10 secured to the U-shaped bracket 10' which in turn is secured within the ring 4. In the center of said disc is a metal ferrule 11 through which extends and is clamped a shaft 12 having annular collars 13 and 13' thereon which are clamped against the upper and lower ferrules 11 and 11' by means of washers 14 and held in place by screws 15. The rubber disc 9' at the bottom may be in all respects similar to the disc 9, having the metal ring 10" secured, in this instance, to the plate 16 supporting the compass proper. The compass is hence cushioned against shocks and jars in all planes, and since the shock absorbers are within the inner ring, the gravitational and acceleration forces will always be axial with respect to the shock absorbers, thus avoiding the lateral stress to which earlier mountings were subjected on list of the ship.

Resonant oscillations of the compass in any plane both translatory (rectilinear) and rotary are damped out by a plurality of my improved dampers 20, one of which is shown in section Fig. 2. Each damper is shown as comprising a liquid container or cylinder 21 resting on the platform 16 which is supported by the shock absorbers 7, 7' and 8, 8'. Said container is filled with a viscous liquid such as heavy oil and has a restricted, open neck 23. A plunger or piston 24 is shown within the container, having a stem 24' secured to the ring 4 by means of the plate 25. The piston is made up of a number of alternate washers 28 and plates 29, said plates being spaced by the relatively thick washers, all secured to the lower end of said stem between top plate 26 and bottom plate 27. Thin rings or annular plates 30 surround each washer. The hole 31 in each ring is of larger diameter than each washer and the outer periphery of the ring is of slightly less diameter than the interior of the liquid container.

The result is that relative up and down movements of the piston and container are resisted by the fact that the oil has to flow past the edge of each ring 30 and the wall in order to pass from one side of the piston to the other. This results in effective damping of up and down vibrations. My device also damps relative lateral movements in any direction since in such case the edge of the discs 30 will strike the inner wall of the inner container and further movement will be resisted by the friction and viscosity drag between each disc with the plate on which it rests. Relative tilting of the two parts is also damped by the combination of the two actions above described.

My improved damper is especially adapted for use in connection with a universal resilient support such as the shock absorber which is described above, since the Lord shock absorber permits movement in all directions and my damper is effective in all directions.

In the type of gyrocompass to which my damper is shown as applied, it is very effective in suppressing oscillations of the compass and its gimbal, both translatory and rotational, acting both as an energy absorber and to throw the oscillations of the compass and its support 16 out of phase with the causative ship's vibrations and also with the oscillations of the ring 4 and its supported parts. The function of these dampers is really two-fold. Firstly, the said dampers effectively destroy the lateral resonant oscillations of the compass with respect to ring 4 in all three planes, including rectilinear as well as rotational oscillations. Secondly, the dampers act to stabilize the gimbal ring 2 and its supported parts by introducing a phase difference between the lateral shift of the compass element within ring 4 and the pendulous moment acting on this unit, in much the fashion of coupled pendulums with a damping connection between the same. However, friction dampers or brakes 32 and 33 may also be employed for this purpose, if the other dampers are not sufficiently effective, but the latter have the advantage that they do not tend to set up oscillations in the compass during rolling and pitching of the ship.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In a universal shock mounting for suspending a sensitive member from a supporting member subject to vibration, a cylinder secured to one of said members and adapted to contain a liquid and a piston loosely mounted therein, comprising a stem secured to the other of said members, a series of spaced plates clamped thereto, and a plurality of rings loosely held between said plates having an outside diameter less than that of the cylinder and an inner diameter which is large enough to permit lateral movement.

2. In a universal shock mounting for suspending a sensitive member from a supporting member subject to vibration, a cylinder secured to one of said members and adapted to contain a liquid and a piston loosely mounted therein, comprising a stem secured to the other of said members, a series of alternate plates and washers clamped thereon, and a series of rings, one of which loosely surrounds each washer and has an external diameter less than that of the cylinder and a thickness less than the washer, whereby damping action is secured both for axial movements of the piston and for lateral movements thereof within the cylinder.

3. In a universal shock mount for gyroscopes and the like, an outer support, a gimbal ring pivotally mounted therein on a horizontal axis, an inner ring pivotally mounted within said gimbal on an axis normal to said other axis, a sensitive element resiliently suspended from said inner ring in all planes, and fluid damping means acting between said inner ring and said element for damping oscillations of the gyroscope about both said pivotal axes and rectilinearly, including a plurality of cylinders and pistons secured respectively to said ring and element, each piston comprising a plurality of fixed spaced plates and alternate loosely mounted rings between said plates of less diameter than the cylinder.

4. In a gyro-compass, an outer support, a gimbal arrangement having a major ring mounted on said support to pivot about a horizontal axis, a minor ring mounted within said major ring to pivot about a normally horizontal axis perpendicular to the pivot axis of the major ring, a compass element, a plurality of equidistantly arranged resilient supports for shock mounting said compass element in said minor ring against both vertical and lateral vibrations, and means associated with each of said shock mounting supports for damping the oscillations of the compass element both vertically and laterally.

FREDERICK D. BRADDON.